US009946743B2

(12) United States Patent
Mosko et al.

(10) Patent No.: US 9,946,743 B2
(45) Date of Patent: Apr. 17, 2018

(54) ORDER ENCODED MANIFESTS IN A CONTENT CENTRIC NETWORK

(71) Applicant: CISCO TECHNOLOGY, INC., San Jose, CA (US)

(72) Inventors: Marc E. Mosko, Santa Cruz, CA (US); Ignacio Solis, South San Francisco, CA (US); Glenn C. Scott, Los Altos, CA (US); Christopher A. Wood, Newport Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 572 days.

(21) Appl. No.: 14/595,102

(22) Filed: Jan. 12, 2015

(65) Prior Publication Data
US 2016/0203170 A1 Jul. 14, 2016

(51) Int. Cl.
*G06F 17/30* (2006.01)
*G06F 7/00* (2006.01)

(52) U.S. Cl.
CPC .. *G06F 17/30321* (2013.01); *G06F 17/30327* (2013.01); *G06F 17/30589* (2013.01); *G06F 17/30607* (2013.01); *G06F 17/30946* (2013.01)

(58) Field of Classification Search
CPC ......... G06F 17/30321; G06F 17/30607; G06F 17/30946; G06F 17/30327; G06F 17/30589
(Continued)

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| CN | 103873371 | 6/2014 |
| DE | 1720277 A1 | 6/1967 |

(Continued)

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

(Continued)

*Primary Examiner* — Kuen S Lu
(74) *Attorney, Agent, or Firm* — Edell, Shapiro & Finnan, LLC

(57) ABSTRACT

One embodiment provides a system that facilitates direct seeking of the ordered content of a manifest based on external metadata. During operation, the system determines, by a content producing device, a root manifest, wherein a manifest indicates a set of content objects and their corresponding digests, wherein a respective content object is a data object or another manifest, and is associated with a name that is a hierarchically structured variable length identifier (HSVLI) which comprises contiguous name components ordered from a most general level to a most specific level. The system generates an index associated with the root manifest, wherein the index allows the set of content objects indicated in the root manifest to be searched and accessed directly, thereby facilitating a content consumer to seek to a desired location in the content represented by the root manifest.

21 Claims, 11 Drawing Sheets

(58) Field of Classification Search
USPC .......................................................... 707/741
See application file for complete search history.

(56) References Cited

U.S. PATENT DOCUMENTS

| | | | |
|---|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |

(56) References Cited

U.S. PATENT DOCUMENTS

| | | |
|---|---|---|
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0156912 A1 | 10/2002 | Hurst et al. |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1* | 1/2003 | Tynan ............ G06F 17/3089 705/50 |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |

(56) References Cited

U.S. PATENT DOCUMENTS

| | | |
|---|---|---|
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Lovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231365 A1* | 9/2011 | Bahl ................. G06F 8/34 707/626 |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |

(56) References Cited

U.S. PATENT DOCUMENTS

| | | |
|---|---|---|
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0238740 A1 | 9/2013 | Vass et al. |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | Dekozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0040041 A1 * | 2/2015 | Yang .................... G06T 11/206 715/762 |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222704 A1 * | 8/2015 | Kipp .................. H04L 67/1097 709/213 |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0065677 A1 * | 3/2016 | Mosko .................. H04L 29/12 709/228 |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |

(56) References Cited

FOREIGN PATENT DOCUMENTS

| | | | |
|---|---|---|---|
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011/022405 A2 | 2/2011 |
| WO | 2011049890 A1 | 4/2011 |
| WO | 2012077073 A1 | 6/2012 |
| WO | 2012/094363 A2 | 7/2012 |
| WO | 2013/107502 A1 | 7/2013 |
| WO | 2013123410 | 8/2013 |
| WO | 2015084327 | 6/2015 |

OTHER PUBLICATIONS

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf.

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016].

Marc Mosko et al "All-In-One Streams for Content Centric Networks", May 24, 2015, retrieved from the Internet: http://www.ccnx.org/pubs/AllinOne.pdf [downloaded Jun. 9, 2016].

Cesar Ghali et al. "Elements of Trust in Named-Data Networking", Feb. 13, 2014 Retrieved from the internet Jun. 17, 2016 http://arxiv.org/pdf/1402.3332v5.pdf.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, 23 Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506.

Sun et al.: "Content-Based Route Lookup Using CAMs", Global Communications Conference, IEEE, Dec. 3, 2012.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

B. Lynn$2E.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

(56) References Cited

OTHER PUBLICATIONS

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D. Boneh, C. Gentry, and B. Waters, 'Collusi.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {2013, Aug.). Less pain, most of the gain: Incrementally deployable ICN. In ACM SIGCOMM Computer Communication Review (vol. 43, No. 4, pp. 147-158). ACM.

G. Ateniese, K. Fu, M. Green, and S. Hohenberger. Improved Proxy Reencryption Schemes with Applications to Secure Distributed Storage. In the 12th Annual Network and Distributed System Security Sympo.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

H. Xiong, X. Zhang, W. Zhu, and D. Yao. CloudSeal: End-to$2.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer ScienceVolume 5443 (2009).

V. Jacobson et al., 'Networking Named Content,' Proc. IEEE CoNEXT '09, Dec. 2009.

Jacobson, Van et al. 'VoCCN: Voice Over Content-Centric Networks.' Dec. 1, 2009. ACM ReArch'09.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

(56) References Cited

OTHER PUBLICATIONS

M. Blaze, G. Bleumer, and M. Strauss, 'Divertible protocols and atomic prosy cryptography,' in Proc. EUROICRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "Pkcs#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E. Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology -AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.

(56) References Cited

OTHER PUBLICATIONS

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, lain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014}: 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

J. Lotspiech, S. Nusser, and F. Pestoni. Anonymous Trust: Digital Rights Management using Broadcast Encryption. Proceedings of the IEEE 92.6 (2004).

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010).

RTMP (2009). Available online at http://wwwimages.adobe.com/www.adobe.com/content/dam/Adobe/en/devnet/rtmp/ pdf/rtmp specification 1.0.pdf.

Hogue et al., "NLSR: Named-data Link State Routing Protocol", Aug. 12,2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Extended European Search Report for European Application No. 16150268.7, dated Jun. 13, 2016, 10 pages.

I. Moiseenko, "Fetching content in Named Data Networking with embedded manifests", NDN, Technical Report NDN-0025, 2014, http://named-data.net/techreports.html, Revision 1: Sep. 25, 2014, 3 pages.

* cited by examiner

MANIFEST 400

```
SignedObject 402        = ContentObject [Validation Alg] [ValidationPayload]
ValidationAlg 404       = <e.g., RSA, HMAC>
ValidationPayload 406   = <e.g., a signature>

ContentObject 410       = Name CreateTime [ExpiryTime]
                          PayloadType [Payload | ManifestPayload]
Name 412                = <CCN name of the ContentObject>
CreateTime 414          = <UTC time>
ExpiryTime 416          = <UTC time>
PayloadType 418         = DATA | MANIFEST | <others>
DATA 420                = 0 <application payload>
MANIFEST 422            = 6 <Manifest payload>
Payload 424             = *OCTETS ManifestPayload 430     = *[MetadataSection | PayloadSection]
MetadataSection 432     = SECTION
PayloadSection 434      = SECTION SECTION 440             = [ACL] [ListOfNames] ListOfHashes
ACL 442                 = LINK
ListOfNames 444         = *(NameEntry)
NameEntry 446           = [StartChunk] MediaName
ListOfHashes 448        = NameIndex HASH
NameIndex 450           = OCTET
HASH 452                = 32(OCTET)

LINK 460                = TargetName [TargetKeyId] [TargetHash]
TargetName 462          = <CCN name of link target>
TargetKeyId 464         = <KeyId Restriction>
TargetHash 466          = <ContentObjectHash Restriction>
```

FIG. 4A

MODIFIED SECTION 470

```
SECTION 480             = [ACL] [ListOfNames] ListOfHashes [Ordering]
Ordering 482            = *(OCTET)
ACL 442                 = LINK
ListOfParents 484       = *(ParentEntry)
ParentEntry 486         = [Ordering] LINK
ListOfNames 444         = *(NameEntry)
NameEntry 446           = [StartChunk] MediaName
ListOfHashes 488        = [Ordering] NameIndex HASH
NameIndex 450           = OCTET
HASH 452                = 32(OCTET)
```

FIG. 4B

MANIFEST
PAYLOAD
430

ManifestPayload 430 = {
 .ListOfNames 444 = [
   { .StartChunk=1, .MediaName=/netflix/frozen/Manifest20/},
   { .StartChunk=0, .MediaName=/netflix/frozen/ContentObj10/} ],
 .ListOfHashes 448 = [
   { .NameIndex=2, .Hash= 0x123},
   { .NameIndex=1, .Hash= 0xAAA},
   { .NameIndex=2, .Hash= 0x456},
   { .NameIndex=1, .Hash= 0xBBB} ] }

SAMPLE
INTERESTS
490

INTEREST 490.0 = { Name = /netflix/frozen/ContentObj10/chunk=0,
                   Hash = 0x123 }
INTEREST 490.1 = { Name = /netflix/frozen/Manifest20/chunk=1,
                   Hash = 0xAAA }
INTEREST 490.2 = { Name = /netflix/frozen/ContentObj10/chunk=1,
                   Hash = 0x456 }
INTEREST 490.3 = { Name = /netflix/frozen/Manifest20/chunk=2,
                   Hash = 0xBBB }

FIG. 4C name = /netflix/frozen/index_complete

| | | |
|---|---|---|
| 0; | /netflix/frozen; | hash($CO_{/netflix/frozen}$) |
| 5; | /netflix/frozen; | hash($CO_{/netflix/frozen}$) |
| 10; | /netflix/frozen; | hash($CO_{/netflix/frozen}$) |
| 15; | /netflix/frozen; | hash($CO_{/netflix/frozen}$) |
| 20; | /netflix/frozen/M20; | hash($CO_{/netflix/frozen/M20}$) |
| 25; | /netflix/frozen/M20; | hash($CO_{/netflix/frozen/M20}$) |
| 30; | /netflix/frozen/M20/M30; | hash($CO_{/netflix/frozen/M20/M30}$) |
| 35; | /netflix/frozen/M20/M30; | hash($CO_{/netflix/frozen/M20/M30}$) |
| 40; | /netflix/frozen/M20/M30/M40; | hash($CO_{/netflix/frozen/M20/M30/M40}$) |
| 45; | /netflix/frozen/M20/M30/M40; | hash($CO_{/netflix/frozen/M20/M30/M40}$) |
| 50; | /netflix/frozen/M20/M30; | hash($CO_{/netflix/frozen/M20/M30}$) |
| 55; | /netflix/frozen/M20/M30; | hash($CO_{/netflix/frozen/M20/M30}$) |
| 60; | /netflix/frozen/M20/M30; | hash($CO_{/netflix/frozen/M20/M30}$) |
| 65; | /netflix/frozen/M20; | hash($CO_{/netflix/frozen/M20}$) |
| 70; | /netflix/frozen/M70; | hash($CO_{/netflix/frozen/M70}$) |
| 75; | /netflix/frozen/M70; | hash($CO_{/netflix/frozen/M70}$) |

ROOT MANIFEST 600
EXTERNAL
COMPLETE INDEX
600_C

FIG. 6B

ORDER ENCODED MANIFESTS IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014 (hereinafter "U.S. patent application Ser. No. 14/231,515");

the disclosures of which are herein incorporated by reference in their entirety.

BACKGROUND

Field

This disclosure is generally related to distribution of digital content. More specifically, this disclosure is related to a method and system for facilitating random access to a piece of content in a content centric network.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. CCN is an effective network architecture for delivering content. However, at present, there is no effective way for a content consumer to randomly access a large piece of content in a cost-effective way. For example, a user typically cannot have random access to any location in a movie he is viewing without experiencing significant delays.

SUMMARY

One embodiment provides a system that facilitates direct seeking of the ordered content of a manifest. During operation, the system determines, by a content producing device, a root manifest, wherein a manifest indicates a set of content objects and their corresponding digests, wherein each content object is a data object or another manifest, and is associated with a name that is a hierarchically structured variable length identifier (HSVLI) which comprises contiguous name components ordered from a most general level to a most specific level. The system generates an index associated with the root manifest, wherein the index allows the set of content objects indicated in the root manifest to be searched and accessed directly, thereby facilitating a content consumer to seek to a desired location in the content represented by the root manifest.

In some embodiments, the generated index further comprises a root manifest index that is a content object distinct from the root manifest.

In some embodiments, the root manifest index comprises a complete index for the set of content objects indicated in the root manifest, and the complete index begins from a first object based on a tree-like topology of the set of content objects indicated in the root manifest.

In some embodiments, the content producing device creates, for a respective manifest indicated by the root manifest, a relative index that describes a relative ordering for a subset of content objects indicated by the respective manifest, wherein the root manifest index is a relative index that describes a relative ordering for a subset of content objects indicated by the root manifest.

In some embodiments, a respective manifest indicated by the root manifest includes a link to a parent of the respective manifest.

In some embodiments, the set of content objects are indicated in the root manifest based on a tree-like topology.

In some embodiments, generating the index further comprises: creating an ordering for the content objects indicated in the root manifest, wherein the ordering describes the order of: a respective content object indicated in the root manifest; and for a respective content object indicated in the root manifest that is itself a manifest, each parent and child of the manifest.

In further embodiments, the system retrieves, by a content consuming device, a root manifest, wherein a manifest indicates a set of content objects and their corresponding digests, wherein a respective content object is a data object or another manifest, and is associated with a name that is a hierarchically structured variable length identifier (HSVLI) which comprises contiguous name components ordered from a most general level to a most specific level. The system determines an index associated with the root manifest, wherein the index allows the set of content objects indicated in the root manifest to be searched and accessed directly. The system determines a target seek location of the contents indicated in the root manifest. Subsequently, the system retrieves a content object based on a manifest that most closely matches the target seek location, wherein the closest match manifest is the manifest that is associated with a unit of measure that is less than or equal to the target seek location, thereby facilitating the content consuming device to seek to a desired location without having to traverse the content represented by the root manifest.

In some embodiments, determining the index further comprises retrieving, by the content consuming device, a root manifest index that is a content object distinct from the root manifest.

In some embodiments, determining the index further comprises determining, by a content consuming device, that an ordering for the content objects indicated in the root manifest is included in the root manifest, wherein the ordering describes the order of: a respective content object indicated in the root manifest; and for a respective content object indicated in the root manifest that is itself a manifest, each parent and child of the manifest.

BRIEF DESCRIPTION OF THE FIGURES

FIG. 4A presents a table depicting a format of a manifest, in accordance with an embodiment of the present invention.

FIG. 4B presents a table depicting a format of a modified manifest payload section, in accordance with an embodiment of the present invention.

FIG. 4C presents tables depicting an exemplary manifest payload and corresponding sample interests for retrieving the contents of the exemplary manifest payload, in accordance with an embodiment of the present invention.

FIG. 6B presents a table depicting exemplary contents of a root manifest external complete index, based on FIG. 5, in accordance with an embodiment of the present invention.

DETAILED DESCRIPTION

Figure 1:
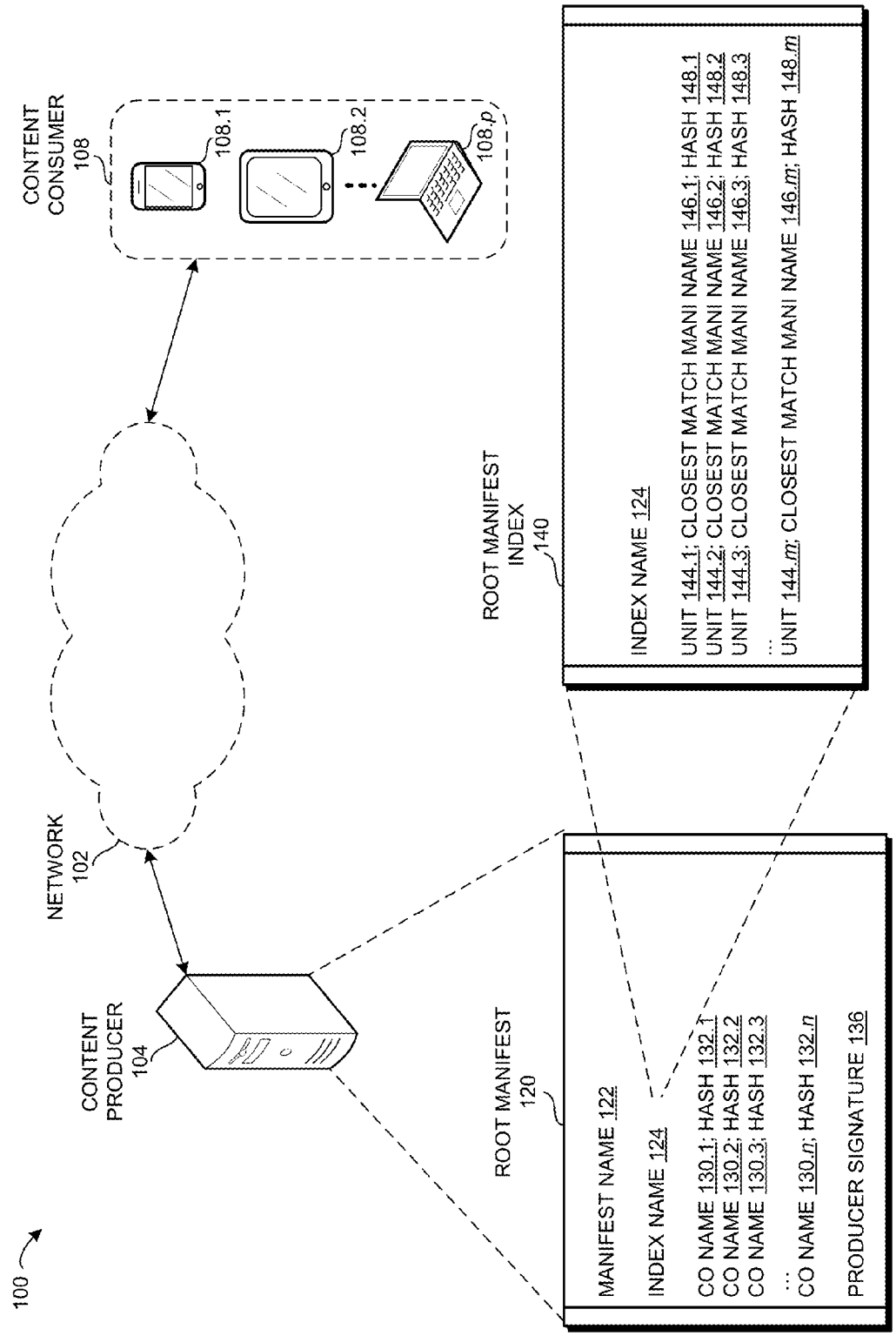
FIG. 1 illustrates an exemplary computing environment that facilitates direct seeking of the ordered content of a manifest, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a content access system that solves the problem of random access to a large piece of content in a CCN by encoding an order for the content. In CCN, a large piece of content, e.g., a movie, video, book, or a genome sequence, can be represented as a manifest, which is a content object that describes a collection of content objects and their corresponding digests. A manifest can include a name and a signature, thus providing trust to a requesting application for the content objects described by the manifest. Signing and verifying aggregates of content objects through the use of a secure content catalog (e.g., a manifest) is described in U.S. patent application Ser. No. 14/231,515 which is herein incorporated by reference. The content described by the manifest can be data objects or other manifests. A manifest contains an inherent order based on a tree-like topology of the collection of objects described by the manifest. In order to retrieve the contents of a manifest, the system can traverse a manifest tree, which contains child and parent nodes ordered in the tree-like structure. For example, a root manifest can describe a collection of objects (data object or other manifests) that represents a movie, and the root manifest can be represented as a tree, as described below in relation to FIG. 5. A content consumer who wishes to play the movie from the beginning retrieves the root manifest and the content objects indicated by the root manifest based on a post-order traversal (e.g., the inherent order of the manifest tree).

If the content consumer wishes to play the movie at a specific target time, the system provides a method to directly access the movie at the specific time. A content producer can encode an order into the root manifest (e.g., create an "order encoded root manifest") by including a link to an external index representing the movie contents. The external index can be a content object that is distinct from the root manifest and can be based on a certain unit of measure, such as minutes. Multiple external index links can be included in the root manifest, thus providing a content consumer with multiple methods for accessing the ordered content. For example, a root manifest that represents a book can include links to an external chapter index and an external page index, while a root manifest that represents a movie can include links to an external time index and an external scene index. An external index typically does not include links to other external indices for order encoding. The root manifest can further include pointers to parent objects and ordering information for each manifest, parent, and child entry, thus preserving the ability to continue traversing through the tree-like topology (e.g., to play or rewind the movie from the specific target time or target seek location). The content producer can also create an order encoded root manifest by including the index information directly in the root manifest. Thus, the system facilitates direct access to a target seek location of the ordered content of a root manifest without requiring a complete traversal of the manifest tree.

In examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175 which is herein incorporated by reference.

Network Architecture and Overview of Order Encoded Manifest

FIG. 1 illustrates an exemplary computing environment 100 that facilitates direct seeking of the ordered content of a manifest, in accordance with an embodiment of the present invention. Computing environment 100 can include a content producer 104, which can include any content producing device that can publish or produce content and fulfill a request for content via a network 102. Computing environment 100 can also include a content consumer 108, which can include any content consuming device that can determine a request for content via a network 102. For example, client device 108 can include a smartphone 108.1, a tablet computer 108.2, and/or a personal computing device 108.p (e.g., a laptop). Computing environment 100 can also include network 102 which can be, for example, a content-centric network (CCN), a named data network (NDN), or an information-centric network (ICN). A content producer (e.g., content producer 104) producer can produce content and create a root manifest (e.g., root manifest 120) to describe the content. The content producer can encode the order of the content described by the root manifest by: including a link to an external index or indices associated with the metadata of the root manifest (e.g., creating an external index); or extending the format of the root manifest to include ordering markers (e.g., directly including index information in the root manifest).

The content producer can create an external index based on two methods: a complete index and a relative index. Both methods rely on the inclusion of metadata in the root manifest. In the first method, the root manifest includes a metadata section that points to a complete, exhaustive table of contents ("external complete index"). An external complete index for a root manifest which represents a movie can indicate an array of, e.g., time increments by minute (for all minutes of the movie) to the nearest manifest containing that time increment ("closest match manifest"). A desired target time can be found by locating the closest match manifest for the desired target time in the external complete index, as described below in relation to FIG. 6B. In the second method, each respective manifest (e.g., the root manifest and any other content object in the collection indicated by the root manifest that is itself a manifest) includes a metadata section that points to an external index, which provides ordering information for a subset of the content objects indicated in the respective manifest ("external relative index"). The ordered subset of content objects relates only to the direct children of the respective manifest. To directly seek to a specified target location based on an external relative index, the system traverses down the manifest tree based on the external relative index associated with each respective manifest, as described below in relation to FIG. 6C. Thus, by encoding an order in an external (complete or relative) index, the content producer creates an order encoded root manifest.

In some embodiments, rather than creating an external index, the content producer creates an order encoded root manifest by directly including complete index information within the root manifest. Note that directly encoding index information in the root manifest may yield less efficient results than using external indices.

For example, in FIG. 1, content producer 104 can create root manifest 120 to describe a piece of content. Root manifest 120 can contain a manifest name 122 and a list of content object names 130.1-130.n. Root manifest 120 can also contain hash values 132.1-132.n associated with content object names 130.1-130.n. In some embodiments, each hash value can be part of a self-certifying content name which uniquely identifies the content object. In addition, root manifest 120 can contain a producer signature 136. Root manifest 120 can contain a pointer to an external index based on an index name 124. For example, the external index is a content object that is distinct from root manifest 120 and has a corresponding name of index name 124. Root manifest 120 is depicted as an order encoded root manifest that includes one link to one external index, indicated by index name 124. Although only one external index is depicted in FIG. 1, recall that as described above, an order encoded root manifest can include multiple links to multiple external indices.

Index name 124 can be associated with a content object such as a root manifest index 140, which contains index name 124 and a list of entries that each include: measurement units 144.1-144.m; closest matching manifest names 146.1-146.m; and hash values 148.1-148.m. Measurement units 144.1-144.m denote the manner in which the index is organized and the unit of measure to be used to search and access the content. For example, if root manifest 120 represents a movie, measurement units 144.1-144.m can be in minutes. Closest matching manifest names 146.1-146.m are the names of the manifests that are the closest to (e.g., less than or equal to) the corresponding measurement units

144.1-144.m ("closest match manifest"). The use cases described below in relation to FIGS. 6B and 6C depict how to determine the closest match manifest. Hash values 148.1-148.m represent hashes of the content objects with closest match manifest names 146.1-146.m. Hash values 148.1-148.m also allow a requesting application (e.g., content consumer 108) to verify integrity by hashing any subsequently obtained manifests and comparing that hash with hash values 148.1-148.m.

Content consumer 108 can retrieve order encoded root manifest 120 by transmitting an interest through network 102 for a content object with manifest name 122. Upon obtaining root manifest 120, content consumer 108 can retrieve root manifest index 140 by transmitting an interest through network 102 for a content object with index name 124. Content consumer 108 can then seek to a specific location within the content of root manifest 120 by using the ordering information included in root manifest index 140, as described below in relation to FIG. 3B. Thus, the system allows content consumer 108 to perform a direct seek within (e.g., randomly access) a large piece of content based on order encoded root manifest 120 created by content producer 104.

Creating an Order Encoded Manifest

Figure 2:
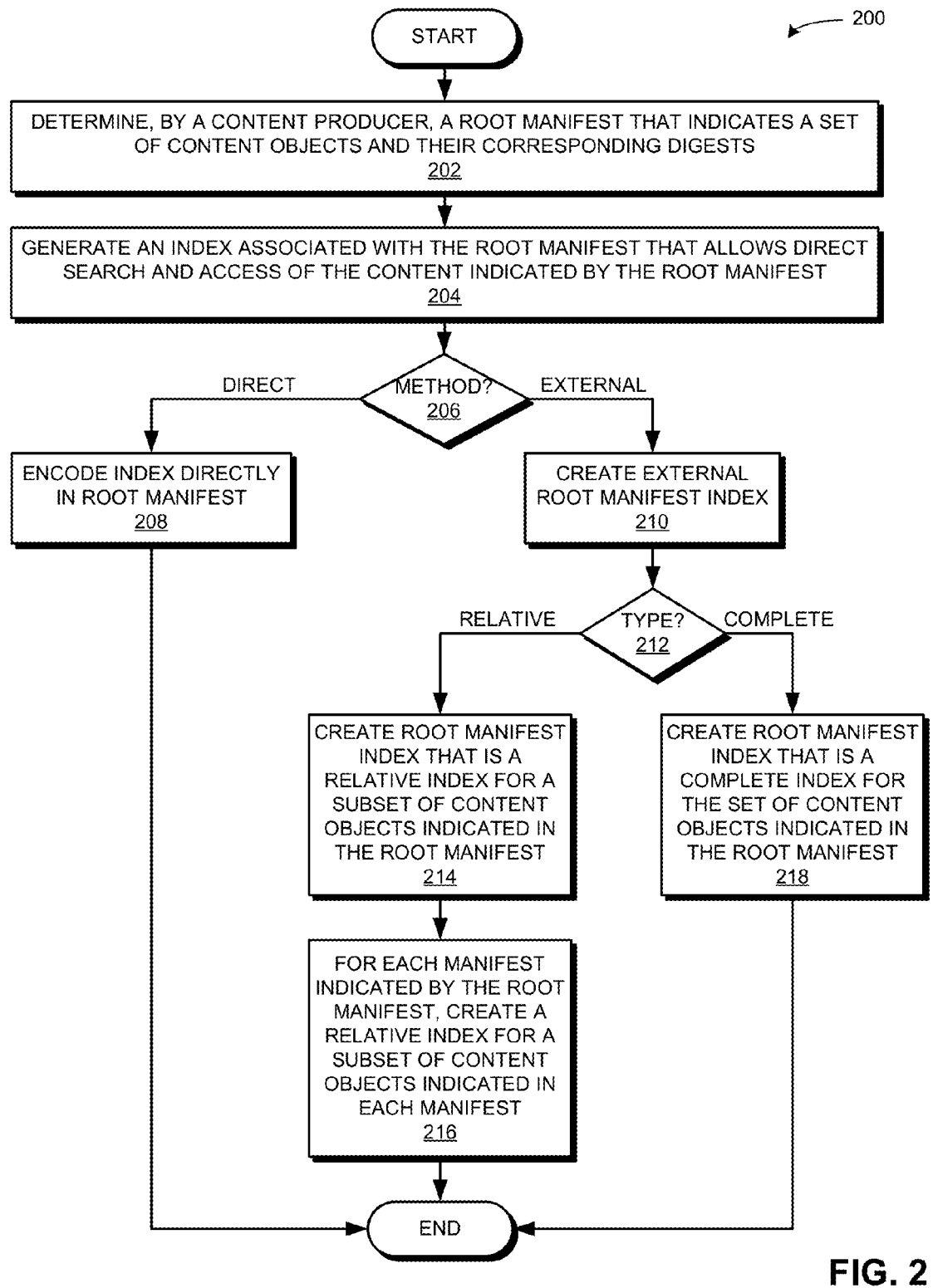
FIG. 2 presents a flow chart illustrating a method performed by a content producer for creating an order encoded manifest, in accordance with an embodiment of the present invention.

FIG. 2 presents a flow chart illustrating a method 200 performed by a content producer for creating an order encoded manifest, in accordance with an embodiment of the present invention. During operation, a content producer determines a root manifest that indicates a set of content objects and their corresponding digests (e.g., hash values) (operation 202). A respective content object can be a data object or another manifest and is associated with a name that is a hierarchically structured variable length identifier (HS-VLI) which comprises contiguous name components ordered from a most general level to a most specific level. The content producer generates an index associated with the root manifest that allows direct search and access of the content indicated by the root manifest (operation 204). The content producer can generate the index based on a direct or external method (decision 206). If the index is generated based on a direct method, the content producer includes the encoded index directly in the root manifest (operation 208). If the index is external, the content producer creates an external root manifest index (operation 210), which can be either a relative index or a complete index (decision 212). As described above, a relative index includes ordering information for a subset of the contents of a respective manifest indicated by the root manifest, where the ordered subset of content objects relates only to the direct children of each respective manifest, and a complete index includes an exhaustive list of all the content objects indicated by the root manifest. The root manifest indicates content objects (both data objects and manifests) by including a list of the names and hashes for each direct child of the root manifest. Each manifest indicated by the root manifest can be described based on a nested hierarchy, as shown in the tree-like topology depicted in FIG. 5, and can include information for each parent and child of the manifest.

If the external index is a relative index, the content producer creates a root manifest index that is a relative index for a subset of the content objects indicated in the root manifest (operation 214). Additionally, for each manifest indicated by the root manifest, the content producer creates a relative index for a subset of the content objects indicated in each manifest (operation 216). If the external index is a complete index, the content producer creates a root manifest that is a complete (e.g., exhaustive) index for the set of content objects indicated in the root manifest (operation 218).

Retrieving Content from Order Encoded Manifest Based on Target Seek

Figure 3A:
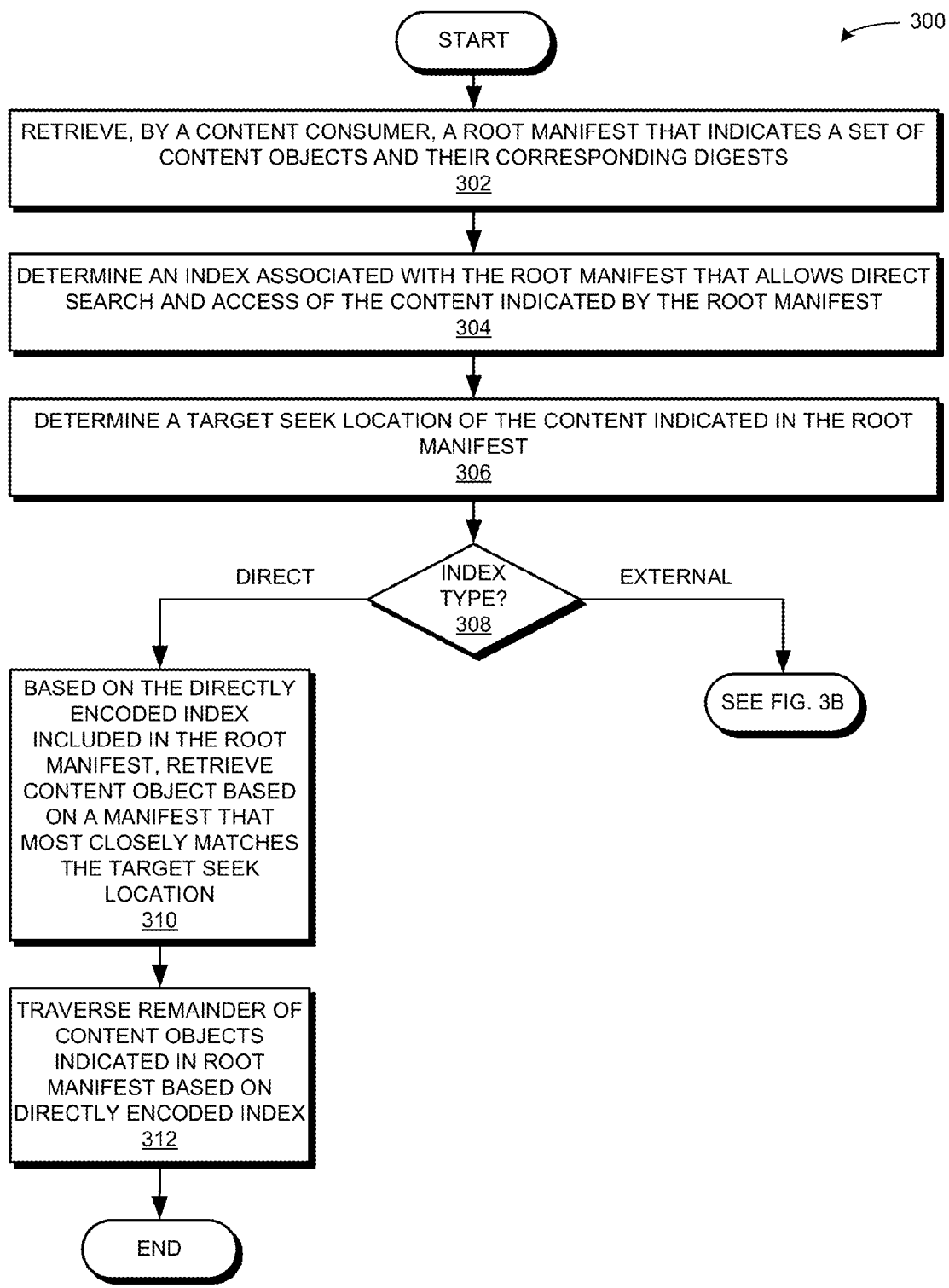
FIG. 3A presents a flow chart illustrating a method performed by a content consumer for retrieving content based on a desired seek location in an order encoded manifest, in accordance with an embodiment of the present invention.

FIG. 3A presents a flow chart illustrating a method 300 performed by a content consumer for retrieving content based on a desired seek location in an order encoded manifest, in accordance with an embodiment of the present invention. During operation, a content consumer retrieves a root manifest that indicates a set of content objects and their corresponding digests (operation 302). The content consumer determines an index associated with the root manifest that allows direct search and access of the content indicated by the root manifest (operation 304). The content consumer also determines a target seek location of the content indicated in the root manifest (operation 306). The index can be a direct index or an external index (decision 308). If the encoded index is directly included in the root manifest, the content consumer retrieves a content object based on a manifest that most closely matches the determined target seek location (operation 310). Recall that each manifest can include pointers to the parent and all children of the manifest, thereby providing ordering information that allows a content consumer to continue a forward or backward traversal of the contents of the manifest tree from the target seek location. The system can traverse the remainder of the content objects indicated in the root manifest based on the directly encoded index (operation 312). If the encoded index is a link to an external index, the operation continues as shown in FIG. 3B.

Figure 3B:
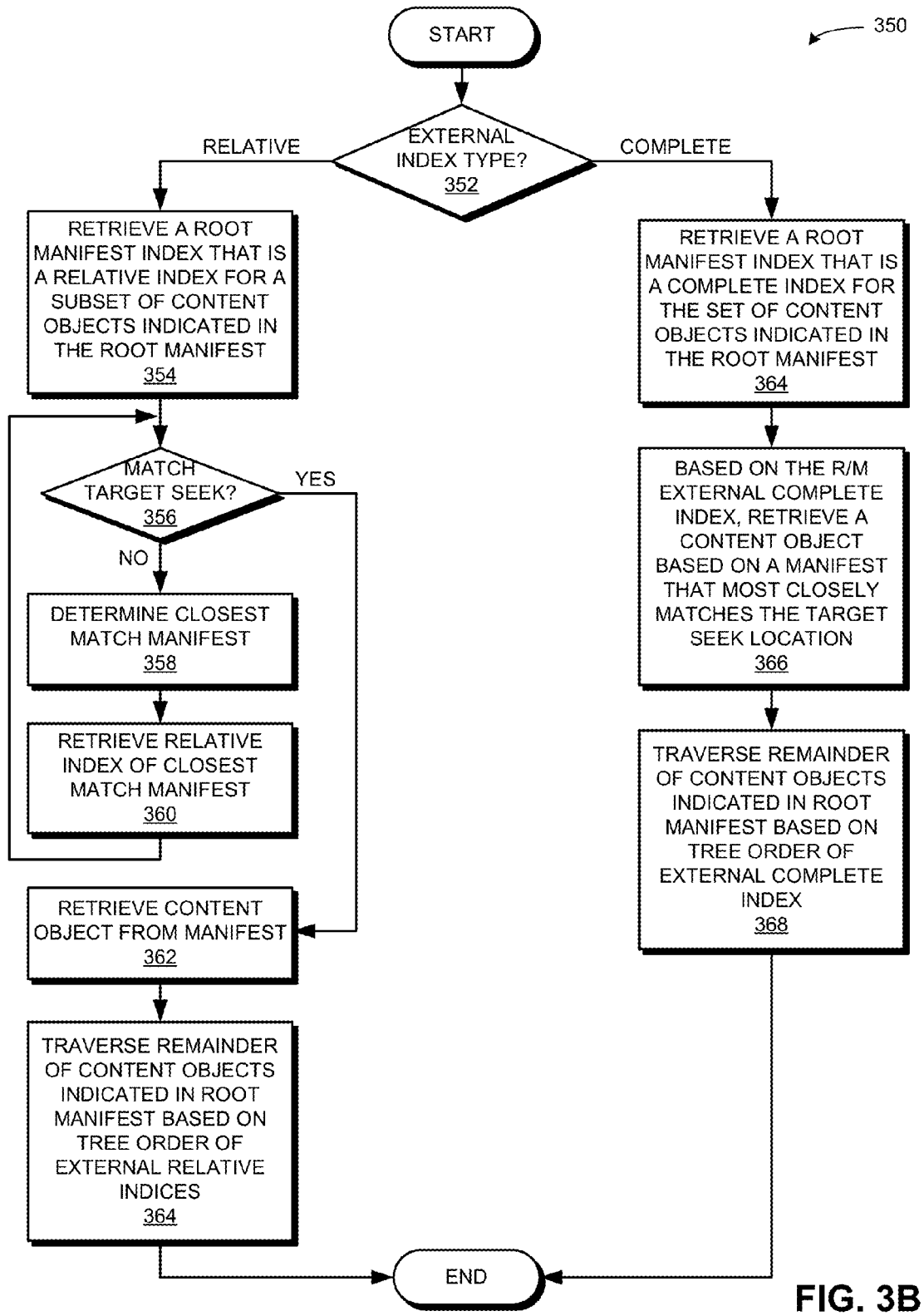
FIG. 3B presents a flow chart illustrating a method performed by a content consumer for retrieving content based on a desired seek location in an order encoded manifest, in accordance with an embodiment of the present invention.

FIG. 3B presents a flow chart illustrating a method 350 performed by a content consumer for retrieving content based on a desired seek location in an order encoded manifest, in accordance with an embodiment of the present invention. The external index can be either a relative index or a complete index (decision 352). If the external index is a relative index, the content consumer retrieves a root manifest index that is a relative index for a subset of the content objects indicated in the root manifest (operation 354). The external relative index can include a parent pointer to the name of the parent manifest, which allows the system to continue traversing through the manifest tree from the target seek location. The external relative index can further include a pointer to the root manifest (when different from the parent manifest) such that the system can quickly skip to the root of the tree. Thus, the use of external relative indices allows for any form of threading through the tree for quicker and more efficient seek operations.

Based on the external relative index, the content consumer determines whether a content object indicated by the current manifest (here, the root manifest) matches the target seek (e.g., if a content object indicated by the current manifest is a data object with a name and corresponding hash that matches the name and corresponding hash of the target seek) (decision 356). If there is a match, the content consumer retrieves the content object (as indicated in the manifest) (operation 362). The system can traverse the remainder of the content objects indicated in the root manifest based on the tree-like topology of the external relative indices (operation 364). If there is not a match, the content consumer determines a manifest of the subset of content objects indicated in the relative index that most closely matches the target seek location ("closest match manifest") (operation 358). The content consumer retrieves the external relative index of the closest match manifest (operation 362) and, based on the retrieved external relative index, determines whether a content object indicated by the current manifest (here, the closest match manifest) matches the target seek (e.g., if a content object indicated by the current manifest is a data object with a name and corresponding hash that matches the name and corresponding hash of the target seek) (decision 356). The system repeats operation 358, operation 360, and decision 356, until a match for the target seek is found. Subsequently, the operation continues as described in relation to operation 362.

If the external index is a complete index, the content consumer retrieves a root manifest index that is a complete index for the set of content objects indicated in the root manifest (operation 364). Because the complete index is an exhaustive list of the contents indicated in the root manifest, the content consumer does not need to traverse the entire manifest tree to obtain the content object corresponding to the target seek. Based on the external complete index, the content consumer retrieves a content object based on a manifest that most closely matches the target seek ("closest match manifest") (operation 366). The system can then traverse the remainder of the content objects indicated in the root manifest based on the tree-like topology of the external index (operation 368).

Format of Exemplary Standard Manifest and Manifest Payload

FIG. 4A presents a table depicting a format of a standard CCN manifest 400, in accordance with an embodiment of the present invention. The format of manifest 400 is based on the metalanguage of Augmented Backus-Naur Form (ABNF). Manifest 400 can contain a signed object 402 field that indicates the content object (manifest 400) and can also include a validation algorithm and a validation payload. A validation algorithm 404 field can contain, e.g., an RSA or an HMAC. A validation payload 406 field can contain, e.g., a signature of the producer of the manifest. Validation algorithm 404 and validation payload 406 are optional fields designed for integrity checks or authentication, and do not affect the contents of the manifest. A content object 410 field indicates a name, create time, expiry time, and payload type of the content object. A name 412 field indicates the CCN name of the content object. A create time 414 field and an expiry time 416 field indicate the respective create and expiration times in, e.g., a UTC time. A payload type 418 field indicates whether the payload type is data, manifest, or other. For example, a data 420 field can contain a value that represents the application payload, and a manifest 422 field can contain a value that represents the manifest payload. A payload 424 field can be a list of content objects. If payload type 418 indicates a manifest, the payload of the content object (manifest 400) will be parsed as a manifest payload 430.

Manifest payload 430 can include a metadata section and a payload section. A metadata section 432 points to elements that describe a payload section 434. Both metadata section 432 and payload section 434 can be encoded as a section. A section 440 field is defined as an optional Access Control List (ACL) and two arrays. An ACL 442 field contains a link 460 which includes a target name 462 field that is the CCN name of the link target, a target KeyId 464 field that is the KeyId restriction for the link target, and a target hash 466 field which contains a content object hash restriction for the link target. The first array in section 440 is a list of names 444 field, which includes a list of name entries. A name entry 446 field includes a root media name and can also include a start chunk. The list of media names can be empty if all hashes are based on the name of the current content object. The second array in section 440 is a list of hashes 448, which includes a name index 450 and a hash 452. The content object name has a name index value of "0," so list of names 444 begins with a name index value of "1." If the content object name has an associated chunk number, that number plus one is the implied start chunk of the corresponding entry with a name index value of "1." If the start chunk is present in the name entry 446 field, then the names are assumed to include a chunk name component. The starting chunk number is the sum of the start chunk and the relative order, where the relative order is the ordinal position of the list of hashes 448 entry that corresponds to the name index.

FIG. 4C presents tables depicting an exemplary manifest payload 430 and corresponding sample interests 490 for retrieving the contents of exemplary manifest payload 430, in accordance with an embodiment of the present invention. As discussed above in relation to FIG. 4A, manifest payload 430 includes a list of names 444 and a list of hashes 448. Both entries in list of names 444 include a start chunk, so the names are assumed to include a chunk name component. The first entry in list of names 444 has a start chunk value of "1" and a root media name of "/netflix/frozen/manifest20" while the second entry has a start chunk value of "0" and a root media name of "/netflix/frozen/contentobj10." The four entries in list of hashes 448 correspond to various chunks of the content objects indicated in list of names 444. Recall that list of names 444 begins with a name index value of "1" because the content object name has a name index value of "0." Thus, the first entry in list of names 444 corresponds to a name index value of "1" and the second entry in list of names 444 corresponds to a name index value of "2." The set of generated interests for the contents of manifest payload 430 are depicted in sample interests 490. The format of manifest payload 430 allows a requesting application (e.g., a content consumer) to interleave the retrieval of a series of content objects with different media names and different chunk number sequences. For example, interests 490.0 and 490.2 are interests for data objects indicated by the names "/netflix/frozen/contentobj10/chunk=0" and "/netflix/frozen/contentobj10/chunk=1," with respective hash values of "0x123" and "0x456," while interests 490.1 and 490.3 are interests for manifests indicated by the names "netflix/frozen/manifest20/chunk=1" and "/netflix/frozen/manifest20/chunk=2," with respective hash values of "0xAAA" and "0xBBB."

FIG. 4B presents a table depicting a format of a modified manifest payload section 470, in accordance with an embodiment of the present invention. Modified section 470 can either be directly encoded in manifest 400 or include a link to external data (e.g., an external complete index or an external relative index). A section 480 field contains an optional Access Control List (ACL) and three arrays. As shown in FIG. 4A, ACL 442 contains link 460 which includes a target name 462 that is the CCN name of the link target, a target KeyId 464 field that is the KeyId restriction for the link target, and a target hash 466 field which contains a content object hash restriction for the link target. The first array is a list of names 444, the second array is a list of hashes 448, and the third array is an ordering 472. As described above for the standard manifest 400 depicted in FIG. 4A, the first array is a list of names 444 field, which includes a list of name entries. A name entry 446 field includes a root media name and can also include a start chunk. The second array is a list of hashes 488, which includes an ordering 482, a name index 450 and a hash 452. The third array in section 480 is an ordering indicating an ordering for the content objects described in payload section 434 of manifest 400. Modified section 470 further includes a list of parents 484 that is a list of parent entries, where a parent entry 486 includes ordering 482 and a link to the respective parent.

Exemplary Topology and Corresponding Manifests

Figure 5:
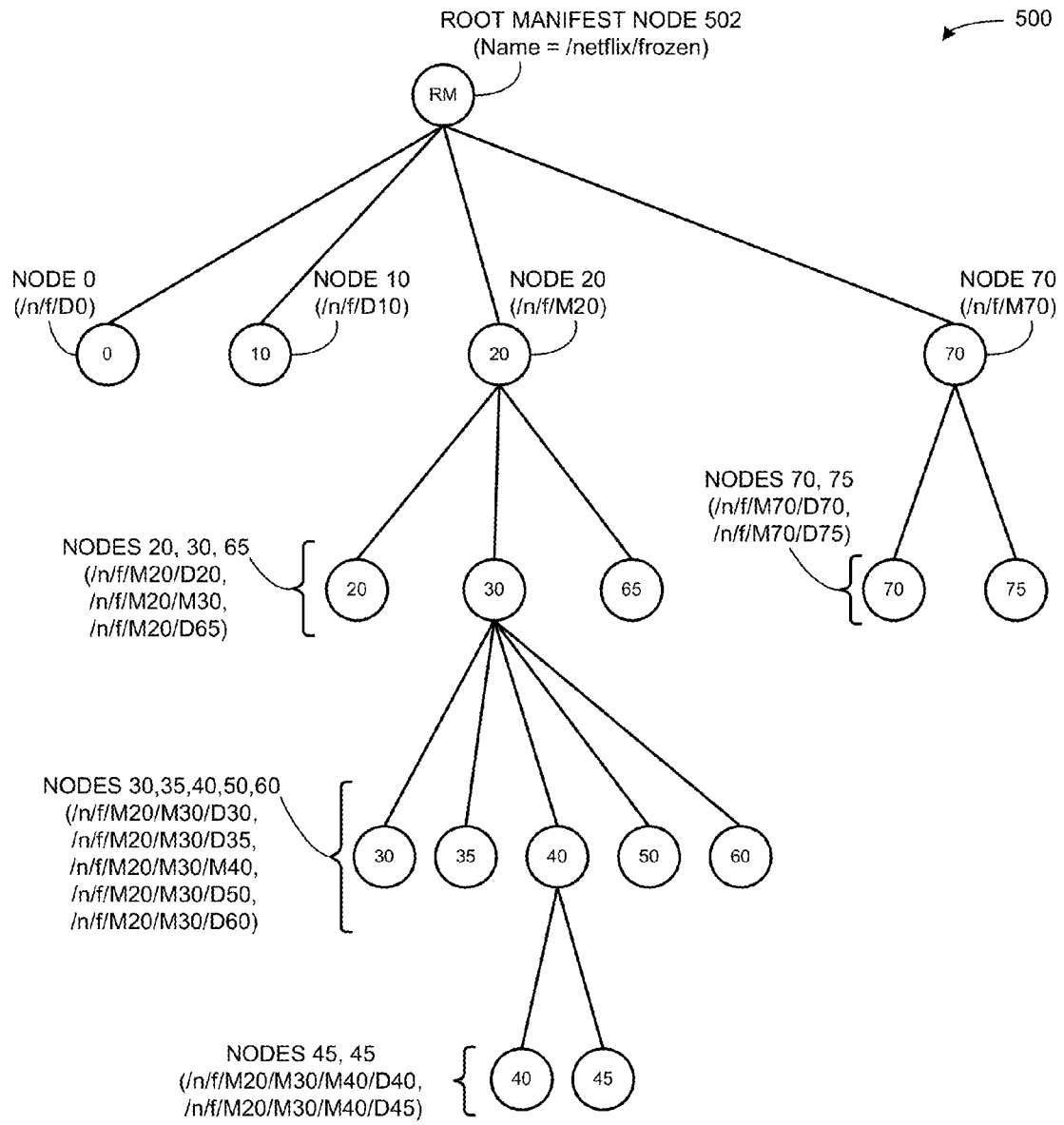
FIG. 5 presents an exemplary tree-like topology corresponding to an exemplary root manifest, in accordance with an embodiment of the present invention.

FIG. 5 presents an exemplary tree-like topology 500 corresponding to an exemplary root manifest, in accordance with an embodiment of the present invention. Root manifest tree 500 depicts a root manifest node 502 with a name of "/netflix/frozen" and four child nodes: a node 0 that is a data object with a name of "/netflix/frozen/D0"; a node 10 that is a data object with a name of "/netflix/frozen/D10"; a node 20 that is a manifest with a name of "/netflix/frozen/M20"; and a node 70 that is a manifest with a name of "/netflix/frozen/M70." Node 20 is a manifest that has three child nodes: a node 20 that is a data object with a name of "/netflix/frozen/M20/D20"; a node 30 that is a manifest with a name of "/netflix/frozen/M20/M30"; and a node 65 that is a data object with a name of "/netflix/frozen/M20/D65." Node 30 is a manifest that has five child nodes: a node 30 that is a data object with a name of "/netflix/frozen/M20/M30/D30"; a node 35 that is a data object with a name of "/netflix/frozen/M20/M30/D35"; a node 40 that is a manifest with a name of "/netflix/frozen/M20/M30/M40"; a node 50 that is a data object with a name of "/netflix/frozen/M20/M30/D50"; and a node 60 that is a data object with a name of "/netflix/frozen/M20/M30/D60." Node 40 is a manifest that has two child nodes: a node 40 that is a data object with a name of "/netflix/frozen/M20/M30/M40/D40"; and a node 45 that is a data object with a name of "/netflix/frozen/M20/M30/M40/D45." Node 70 is a manifest that has two child nodes: a node 70 that is a data object with a name of "/netflix/frozen/M70/D70"; and a node 75 that is a data object with a name of "/netflix/frozen/M70/D75."

Figure 6A:
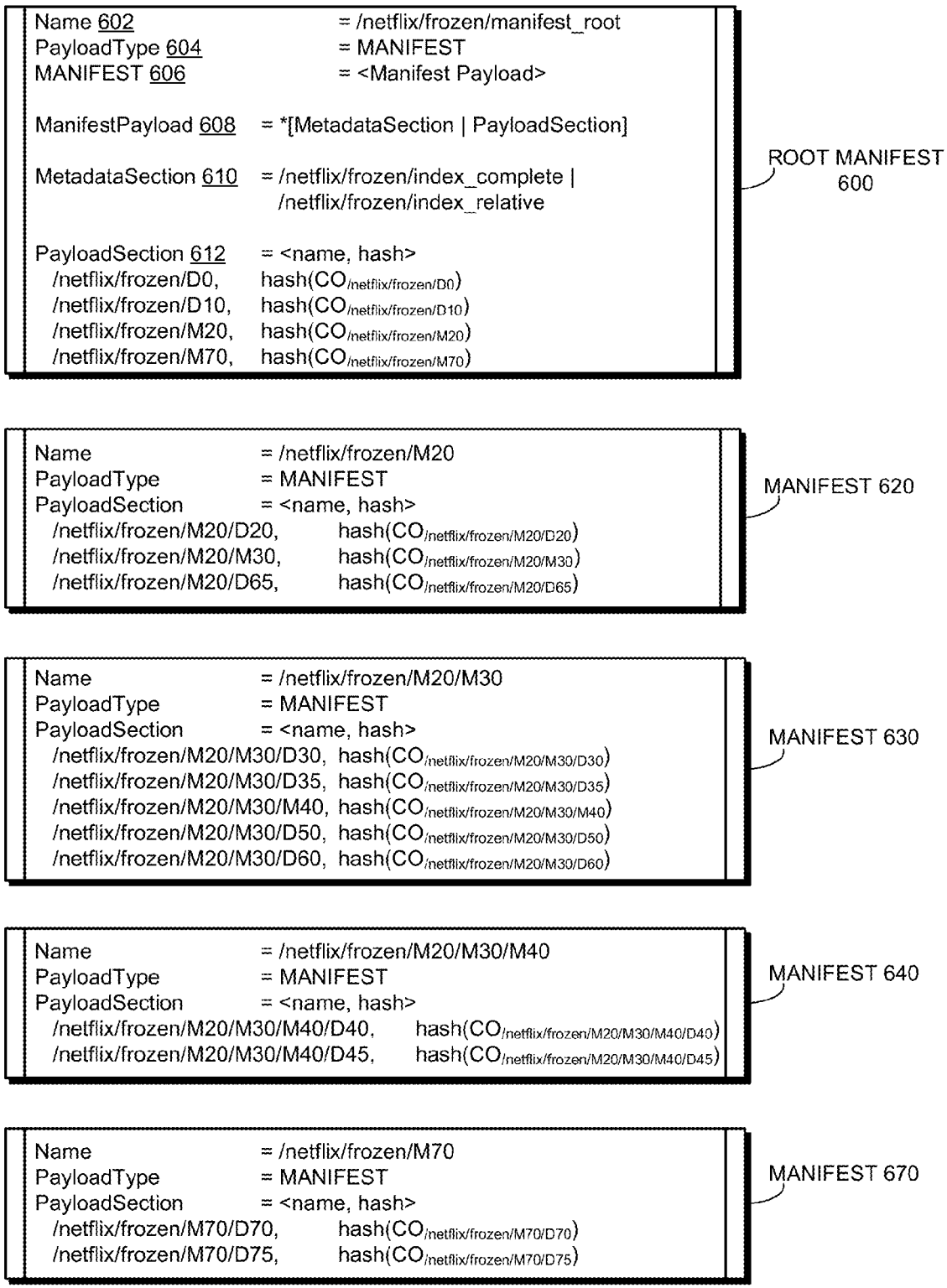
FIG. 6A presents tables depicting exemplary contents of the root manifest and the manifests indicated by the root manifest corresponding to FIG. 5, in accordance with an embodiment of the present invention.
Figure 6C:
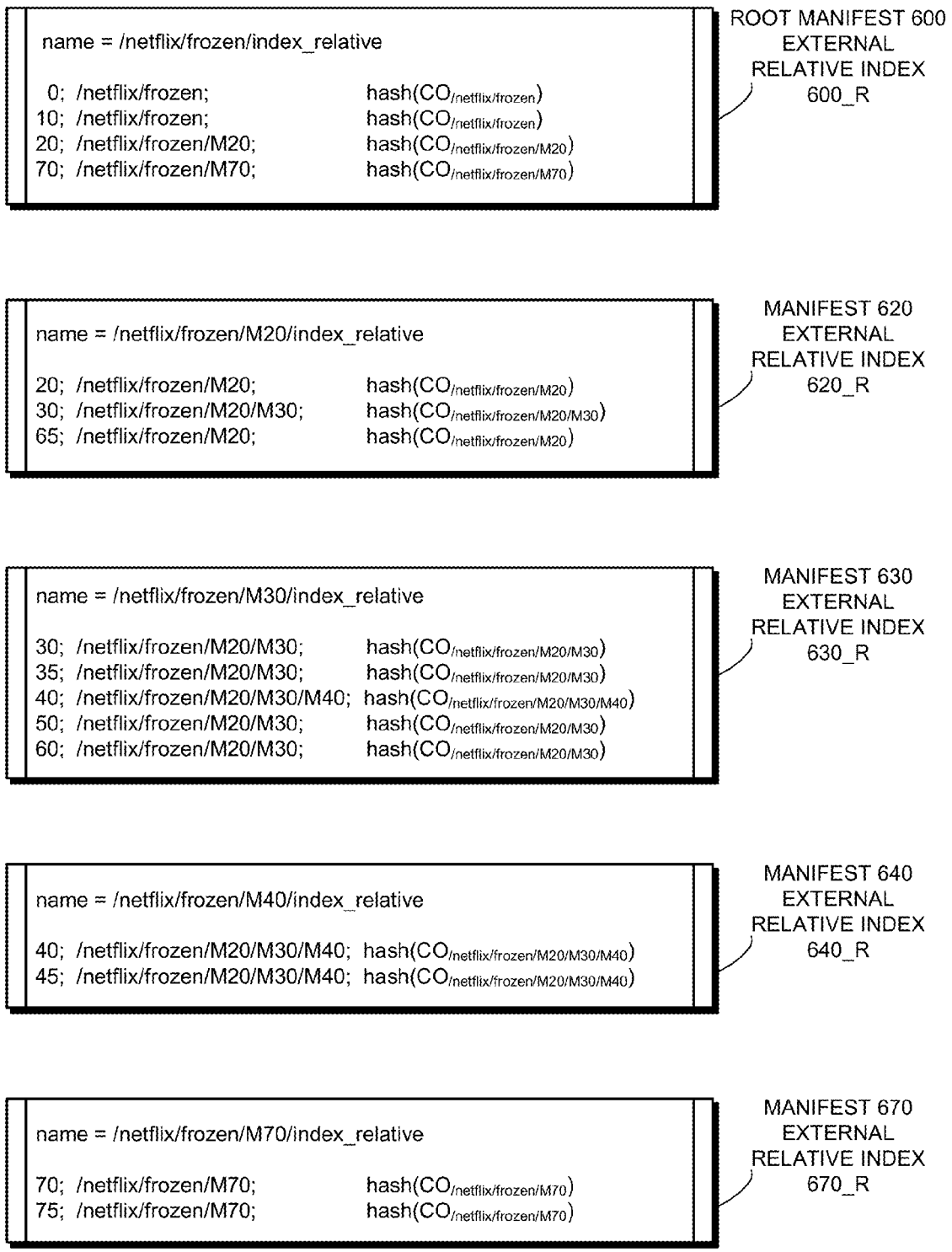
FIG. 6C presents tables depicting exemplary contents of a root manifest external relative index and the external relative indices associated with each manifest indicated in the root manifest, based on FIG. 5, in accordance with an embodiment of the present invention.

FIG. 6A presents tables depicting exemplary contents of the root manifest and the manifests indicated by the root manifest represented by tree topology 500 as described in relation to FIG. 5, in accordance with an embodiment of the present invention. A root manifest 600 includes: a name 602 field with a value of "/netflix/frozen/manifest_root"; a payload type 604 field with a value of "MANIFEST"; a manifest 606 field that corresponds to a manifest payload 608 with a value as indicated in a metadata section 610 and a payload section 612. Metadata section 610 is a link to an encoded index, which is a content object with the name of "/netflix/frozen/index_complete" (see FIG. 6B, described below) or "/netflix/frozen/index_relative" (see FIG. 6C, described below). The external index (e.g., the root manifest index) is a content object that is distinct from the root manifest. Payload section 612 is a list of names and a list of corresponding hashes. Note that the tables describing the various manifests in FIG. 6A include only a list of "<name, hash>" pairs rather than the more detailed inclusion of start chunks and name indices described in relation to FIGS. 4A and 4C. For example, manifest 620 is shown with a name of "/netflix/frozen/M20" of payload type "MANIFEST" with a payload containing the following <name, hash>pairs: "/netflix/frozen/M20/D20", hash(CO/netflix/frozen/M20/D20); "/netflix/frozen/M20/M30", hash(CO/netflix/frozen/M20/M30); and "/netflix/frozen/M20/D65", hash(CO/netflix/frozen/M20/D65). Manifests 630, 640, and 670 are similarly depicted and correspond to tree topology 500 as described in FIG. 5.

Exemplary External Complete Index and Corresponding Use Case

FIG. 6B presents a table depicting exemplary contents of a root manifest 600 external complete index 600_C, based on FIG. 5 and the manifest payloads as described in FIG. 6A, in accordance with an embodiment of the present invention. In some embodiments, the contents of external complete index 600_C are included and encoded directly in root manifest 600. External complete index 600_C includes a name with a value of "/netflix/frozen/index_complete," which corresponds to the value of metadata section 610 of root manifest 600 in FIG. 6A. Index 600_C further includes a list of entries that covers the complete contents of the root manifest, where each entry indicates: a measurement unit that indicates the manner in which the index is organized (e.g., the unit of measure that can be used to search and access the contents); a name of the closest matching manifest which is the manifest that is the closest to (e.g., less than or equal to) the corresponding unit of measure ("closest match manifest"); and a hash value which represents a hash of the manifest associated with the name of the closest match manifest. Index 600_C can be organized based on 5-second increments in a movie and contain a complete list of references to the manifest that contains a desired content object. Note that while index 600_C lists 5-second increments, a search can be conducted based on smaller time increments, such as a 1-second increment. The system determines the closest match manifest based on the manifest that matches the entry corresponding to a unit that is less than or equal to the desired seek unit. Index 600_C can also begin from a first object based on tree topology 500, which represents the set of content objects indicated in root manifest 600. For example, the first entry in external complete index 600_C is an entry for 0 seconds, which corresponds to Node 0, the first object of root manifest 600 as shown in tree topology 500.

The following use case for complete index 600_C is based on the exemplary tables presented and described in relation to FIGS. 5, 6A, and 6B and the methods disclosed herein. A content producer creates root manifest 600 and manifests 620, 630, 640, and 670, which correspond to tree-like topology 500 and represent the movie "Frozen." The content producer also creates external complete index 600_C, which contains a complete list by 5-second increments of the contents of root manifest 600 by indicating the closest match manifest for a particular 5-second increment. A content consumer who wishes to access a desired portion (e.g., second 39) of the movie retrieves root manifest 600, determines that payload type 604 is "MANIFEST," and, based on metadata section 610, retrieves root manifest 600 external complete index 600_C based on the name "/netflix/frozen/index_complete." The content consumer uses index 600_C to determine the closest match manifest name. The closest match manifest is determined based on the unit of measure which is the closest to the desired seek location, where the "closest" match is that which is less than or equal to the desired seek location. In this case, the closest match manifest is found at the entry for 35 seconds, which is the closest match that is less than or equal to the desired seek location of 39 seconds. That entry indicates that the name of the closest match manifest is "/netflix/frozen/M20/M30," which corresponds to manifest 630. The content consumer retrieves manifest 630 by name and can verify manifest 630 by comparing the associated hash values (e.g., by hashing retrieved manifest 630, shown in FIG. 6A, and comparing that hash to the corresponding hash value for the entry at 35 seconds in external complete index 600_C. The content consumer then retrieves the contents of manifest 630 and traverses the retrieved contents of manifest 630 until the desired content object is obtained, e.g., the content object with the name of "/netflix/frozen/M20/M30/D35." Thus, complete index 600_C allows the content consumer to seek to a specific location in the contents indicated by the root manifest without having to traverse the entire contents of the root manifest.

Exemplary External Relative Indices and Corresponding Use Case

FIG. 6C presents tables depicting exemplary contents of a root manifest 600 external relative index 600_R and the external relative indices associated with each manifest indicated in the root manifest (e.g., external relative indices 620_R, 630_R, 640_R, and 670_R), based on FIG. 5 and the manifest payloads as described in FIG. 6A, in accordance with an embodiment of the present invention. External relative index 600_R includes a name with a value of "/netflix/frozen/index_relative," which corresponds to the value of metadata section 610 of root manifest 600 in FIG. 6A. Index 600_R further includes a list of entries that correspond to a subset of the contents of the root manifest, where each entry indicates: a measurement unit that indicates the manner in which the index is organized (e.g., the unit of measure that can be used to search and access the contents); a name of the closest matching manifest which is the manifest that is the closest to (e.g., less than or equal to) the corresponding unit of measure ("closest match manifest"); and a hash value which represents a hash of the manifest associated with the name of the closest match manifest. Index 600_R can be organized based on 5-second increments in a movie, and can contain entries corresponding to the unit of measure in seconds with a value of 0, 10, 20, and 70. Each manifest indicated by the root manifest can also contain its own external relative index. For example: manifest 620 external relative index 620_R can contain entries corresponding to 20, 30, and 65 seconds; manifest 630 external relative index 630_R can contain entries corresponding to 30, 35, 40, 50, and 60 second; manifest 640 external relative index 640_R can contain entries corresponding to 40 and 45 seconds; and manifest 670 external relative index 670_R can contain entries corresponding to 70 and 75 seconds.

The following use case for relative index 600_R is based on the exemplary tables presented and described in relation to FIGS. 5, 6A, and 6B and the methods disclosed herein. A content producer creates root manifest 600 and manifests 620, 630, 640, and 670, which correspond to tree-like topology 500 and represent the movie "Frozen." The content producer also creates external relative indices 600_R, 620_R, 630_R, 640_R, and 670_R. Each of these external relative indices contains a subset of entries based on 5-second increments of the contents of root manifest 600, e.g., by indicating the closest match manifest for each direct child (data object or manifest) of the respective manifest. A content consumer who wishes to access a desired portion (e.g., second 42) of the movie retrieves root manifest 600, determines that payload type 604 is "MANIFEST," and, based on metadata section 610, retrieves root manifest 600 external relative index 600_R based on the name "/netflix/frozen/index_relative." Note that as described above for the use case corresponding to external complete index 600_C shown in FIG. 6B, the system can verify a retrieved content object (e.g., a data object, a manifest, an external complete index, or an external relative index) by hashing the retrieved content object and comparing that hash value to a corresponding included hash value.

The content consumer uses index 600_R to determine the closest match manifest name. As discussed above, the closest match manifest is determined based on the unit of measure which is the closest to the desired seek location, where the "closest" match is that which is less than or equal to the desired seek location. In this case, the closest match manifest is found at the entry for 20 seconds, which is the closest match in external relative index 600_R that is less than or equal to the desired seek location of 42 seconds. That entry indicates that the name of the closest match manifest is "/netflix/frozen/M20," which corresponds to manifest 620. The content consumer then retrieves manifest 620, retrieves relative index 620_R, and again determines the closest match manifest name, which here is at the entry for 30 seconds with a name of "/netflix/frozen/M20/M30," which corresponds to manifest 630. The content consumer retrieves manifest 630, retrieves relative index 630_R, and determines the closest match manifest is at the entry for 40 seconds with a name of "/netflix/frozen/M20/M30/M40," which corresponds to manifest 640. The content consumer retrieves manifest 640, retrieves relative index 640_R, and determines that the closest match manifest is the current manifest (manifest 640), retrieves the contents of manifest 640, and traverses the retrieved contents of manifest 640 until the desired content object is obtained, e.g., the content object with the name of "/netflix/frozen/M20/M30/M40/D40." Thus, the relative indices allow the content consumer to seek to a specific location in the contents indicated by the root manifest by progressively/recursively narrowing down the search without having to traverse the entire contents of the root manifest.

Exemplary Computer and Communication System

Figure 7:
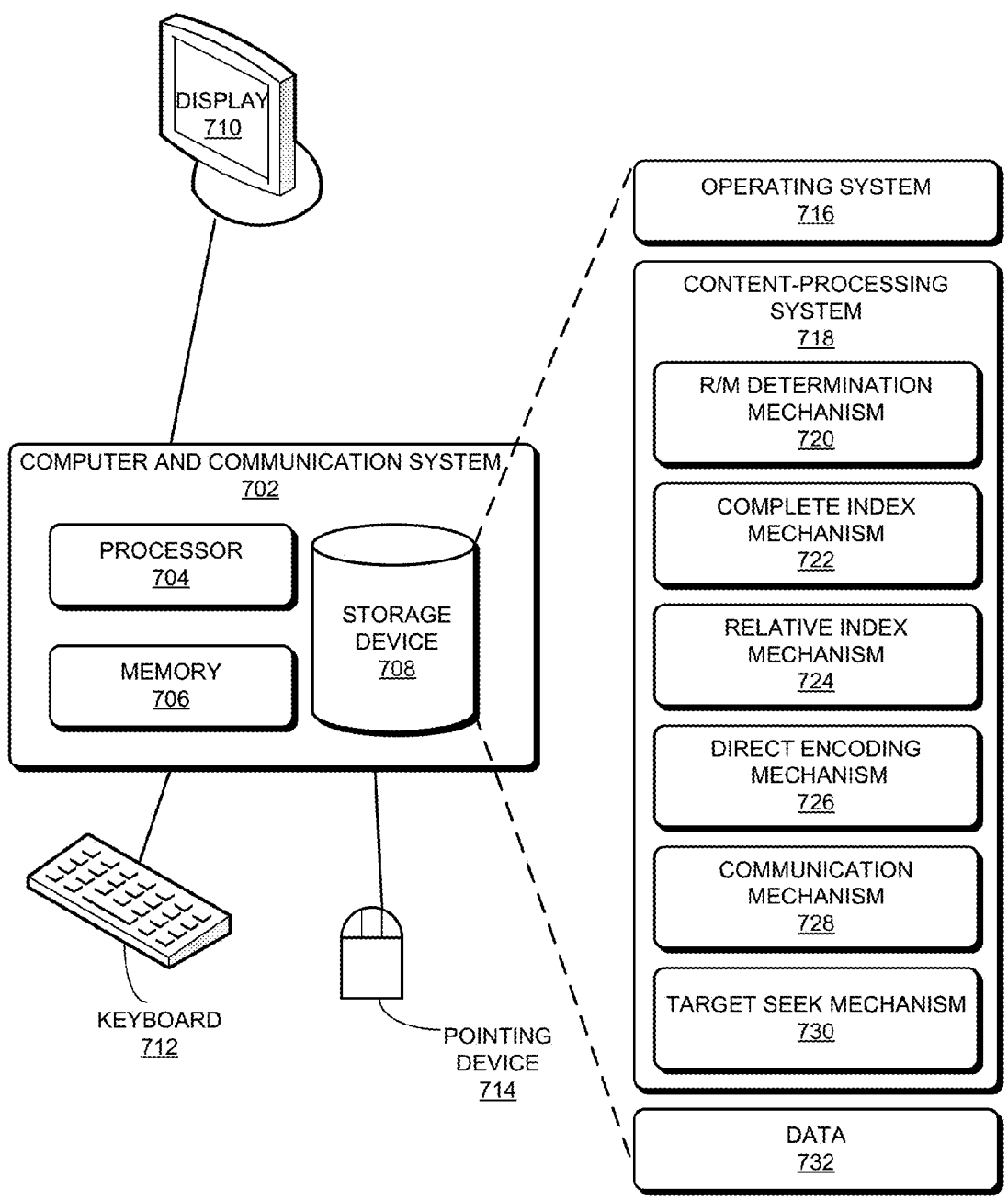
FIG. 7 illustrates an exemplary computer and communication system that facilitates direct seeking of the ordered content of a manifest, in accordance with an embodiment of the present invention In the figures, like reference numerals refer to the same figure elements.

FIG. 7 illustrates an exemplary computer and communication system 702 that facilitates direct seeking of the ordered content of a manifest, in accordance with an embodiment of the present invention. Computer and communication system 702 includes a processor 704, a memory 706, and a storage device 708. Memory 706 can include a volatile memory (e.g., RAM) that serves as a managed memory, and can be used to store one or more memory pools. Furthermore, computer and communication system 702 can be coupled to a display device 710, a keyboard 712, and a pointing device 714. Storage device 708 can store an operating system 716, a content-processing system 718, and data 732.

Content-processing system 718 can include instructions, which when executed by computer and communication system 702, can cause computer and communication system 702 to perform methods and/or processes described in this disclosure. Specifically, content-processing system 718 may include instructions for determining, by a content producing device, a root manifest, wherein a manifest indicates a set of content objects and their corresponding digests, where a content object is a data object or another manifest (root manifest determination mechanism 720). Content-processing system 718 can include instructions for generating an index associated with the root manifest, where the index allows the set of content objects indicated in the root manifest to be searched and accessed directly, and where the index is a root manifest index that comprises a complete index for the set of content objects indicated in the root manifest (complete index mechanism 722).

Content-processing system 718 can also include instructions for generating an index associated with the root manifest, where the index allows the set of content objects indicated in the root manifest to be searched and accessed directly, and where the index is a root manifest index that comprises a relative index for the set of content objects indicated in the root manifest (relative index mechanism 724). Content-processing system 718 can further include instructions for creating, for a respective manifest indicated by the root manifest, a relative index that describes a relative ordering for a subset of content objects indicated by the respective manifest (relative index mechanism 724). Content-processing system 718 can include instructions for creating an ordering for the content objects indicated in the root manifest, where the ordering is included in the root manifest and describes the order of each content object in the root manifest and, for each content object in the root manifest that is itself a manifest, each parent and child of the manifest (direct encoding mechanism 726).

Content-processing system 718 can additionally include instructions for retrieving, by a content consuming device, a root manifest, where a manifest indicates a set of content objects and their corresponding digests, and where a content object is a data object or another manifest (communication mechanism 728). Content-processing system 718 can include instructions for determining an index associated with the root manifest, where the index allows the set of content objects indicated in the root manifest to be searched and accessed directly, and where the index is a root manifest index that comprises a complete index for the set of content objects indicated in the root manifest (complete index mechanism 722). Content-processing system 718 can further include instructions for determining a target seek location of the contents indicated in the root manifest (target seek mechanism 730). Content-processing system 718 can include instructions for retrieving a content object based on a manifest that most closely matches the target seek location, where the closest match manifest is the manifest that is associated with a unit of measure that is less than or equal to the target seek location (communication mechanism 728).

Content-processing system 718 can further include instructions for determining an index associated with the root manifest, where the index allows the set of content objects indicated in the root manifest to be searched and accessed directly, and where the index is a root manifest index that comprises a relative index for the set of content objects indicated in the root manifest (relative index mechanism 724). Content-processing system 718 can further include instructions for retrieving, for a respective manifest indicated by the root manifest, a relative index that describes a relative ordering for a subset of content objects indicated by the respective manifest (relative index mechanism 724).

Content-processing system 718 can also include instructions for retrieving a root manifest index that is a content object distinct from the root manifest (communication mechanism 728). Content-processing system 718 can include instructions for determining that an ordering for the content objects indicated in the root manifest is included in the root manifest, where the ordering describes the order of each content object in the root manifest and, for each content object in the root manifest that is itself a manifest, each parent and child of the manifest (direct encoding mechanism 726).

Data 732 can include any data that is required as input or that is generated as output by the methods and/or processes described in this disclosure. Specifically, data 732 can store at least: a root manifest that indicates a set of content objects and their corresponding digests; a data object; a manifest; a name associated with each content object, where the name is a hierarchically structured variable length identifier (HS-VLI) which comprises contiguous name components ordered from a most general level to a most specific level; an index associated with the root manifest, where the index allows the set of content objects indicated in the root manifest to be searched and accessed directly; a root manifest index that is a content object distinct from the root manifest; a complete index for the set of content objects indicated in the root manifest, where the complete index begins from a first object based on a tree-like topology of the set of content objects indicated in the root manifest; a relative index for a manifest that describes a relative ordering for a subset of content objects indicated by the manifest; a link to a parent of a manifest; a set of content objects based on a tree-like topology; an ordering for the set of content objects indicated in the root manifest; a root manifest that includes the ordering information; and a target seek location of the contents located indicated in the root manifest.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for encoding content, comprising:

at a content producing device to communicate with a content centric network (CCN):

determining a root manifest that indicates a set of content objects including data objects and other manifests in a hierarchy in which a root node represents the root manifest, intermediate nodes represent the other manifests, and terminal nodes represent data objects mapped back to the root manifest via parent-child relationships with the other manifests, wherein each content object is indicated by a unique name used for routing in the CCN and a corresponding hash, wherein the root manifest indicates (i) names and hashes for data objects that are direct children of the root manifest, and (ii) an identifier of an external root manifest index;

generating the external root manifest index as a named content object distinct from the root manifest and to include a list of entries corresponding to the set of content objects of the hierarchy, wherein the root manifest index allows the set of content objects indicated in the root manifest to be searched and accessed directly, to enable a content consumer to seek a desired location in content represented by the root manifest;

receiving from the CCN a first Interest requesting the root manifest by name and, in response, sending the root manifest to the CCN, wherein the first Interest includes a hash value associated with the root manifest; and receiving from the CCN a second Interest requesting the external root manifest index by name and, in response, accessing the index using the identifier and sending the index to the CCN, wherein the second Interest includes a hash value associated with the external root manifest index.

2. The method of claim 1, wherein each entry of the root manifest index includes a measurement unit used to search the root manifest index for and access the content object corresponding to the entry, a name of the content object corresponding to the entry and that most closely matches the measurement unit, and a hash of the content object corresponding to the entry.

3. The method of claim 2, wherein the root manifest index comprises a complete index for the set of content objects indicated in the root manifest, and wherein the complete index begins from a first object based on a tree-like topology of the set of content objects indicated in the root manifest.

4. The method of claim 2, further comprising:

creating, for a respective manifest indicated by the root manifest, a relative index that describes a relative ordering for a subset of content objects indicated by the respective manifest, wherein the root manifest index is a relative index that describes a relative ordering for a subset of content objects indicated by the root manifest.

5. The method of claim 2, wherein each entry of the external index further defines a path from the root manifest to the content object of the entry in the form of the parent-child relationships.

6. The method of claim 1, wherein the set of content objects are indicated in the root manifest based on a tree-like topology.

7. The method of claim 1, wherein generating the root manifest index further comprises:

creating an ordering for the content objects indicated in the root manifest, wherein the ordering is included in the root manifest, and wherein the ordering describes the order of:
a respective content object indicated in the root manifest; and
for a respective content object indicated in the root manifest that is itself a manifest, each parent and child of the manifest.

8. The method of claim 1, wherein:
the root manifest includes a first identifier of a complete root manifest index and a second identifier of a relative root manifest index; and
the generating includes:
generating the external complete root manifest index such that the external complete root manifest index indicates all of the content objects in the hierarchy; and
generating the external relative root manifest index such that the external relative root manifest index indicates a subset of the content objects in the hierarchy.

9. The method of claim 1, wherein each unique name is a hierarchically structured variable length identifier (HS-VLI) which comprises contiguous name components ordered from a most general level to a most specific level.

10. A computer-implemented method for encoding content, comprising:

at a content consuming device to communicate with a content centric network (CCN):

sending to the CCN a first Interest requesting by name a root manifest in the form of a named content object, wherein the first Interest includes a hash value associated with the root manifest;

receiving from the CCN the requested root manifest, wherein the root manifest indicates a set of content objects including data objects and other manifests in a hierarchy in which a root node represents the root manifest, intermediate nodes represent the other manifests, and terminal nodes represent data objects mapped back to the root manifest via parent-child relationships with the other manifests, wherein each content object is indicated by a unique name used for routing in the CCN and a corresponding hash, wherein the root manifest indicates (i) names and hashes for data objects that are direct children of the root manifest, and (ii) an identifier of an external root manifest index, wherein the root manifest index is in the form of a named content object distinct from the root manifest and allows the set of content objects indicated in the root manifest to be searched and accessed directly;

sending to the CCN a second Interest requesting the external root manifest index by name, wherein the second Interest includes a hash value associated with the external root manifest;

receiving the external root manifest index from the CCN;

determining a target seek location of the contents indicated in the root manifest; and using the external root manifest index, retrieving a content object based on a manifest that most closely matches the target seek location, wherein the closest match manifest is the manifest that is associated with a unit of measure that is less than or equal to the target seek location, thereby facilitating the content consuming device to seek a desired location without having to traverse the content represented by the root manifest.

11. The method of claim 10, wherein the root manifest index comprises a complete index for the set of content objects indicated in the root manifest, and wherein the complete index begins from a first object based on a tree-like topology of the set of content objects indicated in the root manifest.

12. The method of claim 10, wherein the root manifest index is a relative index that describes a relative ordering for a subset of content objects indicated by the root manifest, and wherein determining the index further comprises:

for a respective manifest indicated by the root manifest, retrieving a relative index that describes a relative ordering for a subset of content objects indicated by the respective manifest.

13. The method of claim 10, wherein the set of content objects are indicated in the root manifest based on a tree-like topology.

14. The method of claim 10, further comprising:

determining that an ordering for the content objects indicated in the root manifest is included in the root manifest, wherein the ordering describes the order of:

a respective content object indicated in the root manifest; and for a respective content object indicated in the root manifest that is itself a manifest, each parent and child of the manifest.

15. A computer system for encoding content and for communicating with a content centric network (CCN), comprising:
a processor;
a storage device coupled to the processor and storing instructions that when executed by the processor cause the computer system to perform a method, the method comprising:
determining a root manifest that indicates a set of content objects including data objects and other manifests in a hierarchy in which a root node represents the root manifest, intermediate nodes represent the other manifests, and terminal nodes represent data objects mapped back to the root manifest via parent-child relationships with the other manifests,
wherein each content object is indicated by a unique name used for routing in the CCN and a corresponding hash,
wherein the root manifest indicates (i) names and hashes for data objects that are direct children of the root manifest, and (ii) an identifier of an external root manifest index;
generating the external root manifest index as a named content object distinct from the root manifest and to include a list of entries corresponding to the set of content objects of the hierarchy,
wherein the root manifest index allows the set of content objects indicated in the root manifest to be searched and accessed directly, to enable a content consumer to seek a desired location in content represented by the root manifest;
receiving from the CCN a first Interest requesting the root manifest by name and, in response, sending the root manifest to the CCN, wherein the first Interest includes a hash value associated with the root manifest; and
receiving from the CCN a second Interest requesting the root manifest index by name and,
in response, accessing the root manifest index using the identifier and sending the root manifest index to the CCN,
wherein the second Interest includes a hash value associated with the external root manifest index.

16. The computer system of claim 15, wherein each entry of the root manifest index includes a measurement unit used to search the index for and access the content object corresponding to the entry, a name of the content object corresponding to the entry and that most closely matches the measurement unit, and a hash of the content object corresponding to the entry.

17. The computer system of claim 16, wherein the root manifest index comprises a complete index for the set of content objects indicated in the root manifest, and wherein the complete index begins from a first object based on a tree-like topology of the set of content objects indicated in the root manifest.

18. The computer system of claim 16, wherein the method further comprises:
creating, for a respective manifest indicated by the root manifest, a relative index that describes a relative ordering for a subset of content objects indicated by the respective manifest, wherein the root manifest index is a relative index that describes a relative ordering for a subset of content objects indicated by the root manifest.

19. The computer system of claim 15, wherein a respective manifest indicated by the root manifest includes a link to a parent of the respective manifest.

20. The computer system of claim 15, wherein the set of content objects are indicated in the root manifest based on a tree-like topology.

21. The computer system of claim 15, wherein generating the root manifest index further comprises:
creating an ordering for the content objects indicated in the root manifest, wherein the ordering is included in the root manifest, and wherein the ordering describes the order of:
a respective content object indicated in the root manifest; and
for a respective content object indicated in the root manifest that is itself a manifest, each parent and child of the manifest.

* * * * *